United States Patent
Tse et al.

(10) Patent No.: US 11,824,708 B2
(45) Date of Patent: Nov. 21, 2023

(54) NETWORK MANAGEMENT

(71) Applicant: Telefonaktiebolaget LM Ericsson (publ), Stockholm (SE)

(72) Inventors: Edwin Tse, Montreal (CA); Robert Petersen, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/919,322

(22) PCT Filed: Apr. 30, 2020

(86) PCT No.: PCT/EP2020/062171
§ 371 (c)(1),
(2) Date: Oct. 17, 2022

(87) PCT Pub. No.: WO2021/219233
PCT Pub. Date: Nov. 4, 2021

(65) Prior Publication Data
US 2023/0164025 A1 May 25, 2023

(51) Int. Cl.
*G06F 15/177* (2006.01)
*H04L 41/0803* (2022.01)
(Continued)

(52) U.S. Cl.
CPC ........ *H04L 41/0803* (2013.01); *H04L 41/044* (2013.01); *H04L 41/5009* (2013.01); *H04L 41/5032* (2013.01)

(58) Field of Classification Search
CPC ............... H04L 41/0803; H04L 41/044; H04L 41/5009; H04L 41/5032
(Continued)

(56) References Cited

U.S. PATENT DOCUMENTS

2018/0316564 A1 11/2018 Senarath
2018/0317134 A1 11/2018 Leroux et al.
(Continued)

FOREIGN PATENT DOCUMENTS

WO 2018085973 A1 5/2018
WO 2019184967 A1 10/2019

OTHER PUBLICATIONS

"3rd Generation Partnership Project; Technical Specification Group Services and System Aspects; Management and orchestration; Generic management services; (Release 16)", 3GPP TS 28.532 V16.3.0, Mar. 2020, 230 pages.
(Continued)

*Primary Examiner* — Lan Dai T Truong
(74) *Attorney, Agent, or Firm* — Murphy, Bilak & Homiller, PLLC (57) ABSTRACT

There is provided a method for network management. Transmission of a request for performance of a management task on the network is initiated towards a second entity (20), which is configured to manage network slices of the network. The request comprises information identifying a first network slice (40) of the network and a first programming construct executable to cause the second entity (20) to identify one or more second network slices of the network that are supporting the first network slice (40) and/or one or more first network nodes (60) of the network supporting the first network slice (40). The request comprises a second programming construct executable to cause the second entity (20) to select the first network slice (40), one or more identified second network slices, and/or one or more identified first network nodes (60), on which to perform the management task.

25 Claims, 5 Drawing Sheets

(51) Int. Cl.
H04L 41/044 (2022.01)
H04L 41/5009 (2022.01)
H04L 41/50 (2022.01)

(58) Field of Classification Search
USPC .......................................................... 709/220
See application file for complete search history.

(56) References Cited

U.S. PATENT DOCUMENTS

2019/0230004 A1 7/2019 Zhou et al.
2021/0321325 A1* 10/2021 Srivastava .......... H04L 41/0893

OTHER PUBLICATIONS

"3rd Generation Partnership Project; Technical Specification Group Services and System Aspects; Telecommunication management; Fault Management; Part 2: Alarm Integration Reference Point (IRP): Information Service (IS) (Release 15)", 3GPP TS 32.111-2 V15.1.0, Jun. 2019, 71 pages.

"3rd Generation Partnership Project; Technical Specification Group Services and System Aspects; Telecommunication management; Generic Network Resource Model (NRM) Integration Reference Point (IRP); Information Service (IS) (Release 16)", 3GPP TS 28.622 V16.3.0, Mar. 2020, 50 pages.

* cited by examiner

NETWORK MANAGEMENT

TECHNICAL FIELD

The disclosure relates to methods for network management and entities configured to operate in accordance with those methods.

BACKGROUND

Networks are managed by network operators and customers of the network operators use the network. Different customers of a network operator have different needs. It can be difficult for a network operator to meet all of these different needs. A technique that is currently used by network operators to aid in supporting the different needs of customers is network slicing. Network slicing can be used by a network operator to construct, out of a network of managed functions, customised logical networks for different customers. The logical networks can be customised to meet certain requirements, such as an individual customer's needs. The customised logical networks are called network slices. A network slice can be defined as an (e.g. isolated, separate, or self-contained) end-to-end network. A network slice can be, for example, a portion of a physical network that connects two or more logical network interfaces or devices.

In a sliced network, it can be common for a network slice to require the support of multiple managed network nodes (e.g. physical and/or virtual nodes), for a managed element to be a member of (i.e. support) one or more network slices, and for a network slice to be a member of (i.e. support) one or more other network slices. For example, a network slice ("S-1") may be supported by a group of network slices (e.g. "S-11" and "S-12") and managed network nodes. Moreover, the supporting network slices S-11 and S-12 can themselves be supported by a group of network slices and managed network nodes. The network slice S-1 and its supporting (or subordinate) network slices S-11 and S-12 and managed network nodes is called a network slice tree.

There are various existing techniques for managing a network and, more specifically, managing network slices in a network. However, existing techniques lack a mechanism that allows a network operator to request that a network slice management system performs a specific management task (such as the preparation of a performance report, the preparation of an alarm report, the changing of an operation state) on a specific portion of the network slice tree.

SUMMARY

It is an object of the disclosure to obviate or eliminate at least some of the above-described disadvantages associated with existing techniques.

Therefore, according to an aspect of the disclosure, there is provided a method for network management. The method is performed by a first entity. The first entity is configured to operate a network. The method comprises initiating transmission of a request towards a second entity. The second entity is configured to manage network slices of the network. The request is for performance of a management task on the network. The request comprises information identifying a first network slice of the network. The request comprises a first programming construct executable by the second entity to cause the second entity to identify one or more second network slices of the network supporting the first network slice and/or one or more first network nodes of the network supporting the first network slice. The request comprises a second programming construct executable by the second entity to cause the second entity to select the first network slice, one or more identified second network slices, and/or one or more identified first network nodes on which to perform the management task.

There is thus provided an advantageous method for network management. In particular, there is provided a mechanism that allows a first entity (e.g. operated by an operator of the network) to request that a management task is performed on a specific portion of the network. The mechanism allows this even in the case of a customised logical network. An operator does not need to provide the names of all network slices and all network nodes on which the management task is to be performed. Instead, only the identity of a single (first) network slice needs to be provided together with the first and second programming constructs. This significantly simplifies the procedure for enabling the performance of a management task on a specific portion of the network and thus makes the procedure more efficient. Moreover, as the method only requires transmission of the identity of a single (first) network slice and two programming constructs, rather than many identities of each and every network slice and network node on which the management task is to be performed, the method can conserve bandwidth.

In some embodiments, the one or more second network slices of the network may be directly or indirectly supporting the first network slice.

In some embodiments, the first network slice, the one or more second network slices, and the one or more network nodes may form a hierarchy.

In some embodiments, the first network slice may be at the apex of the hierarchy.

In some embodiments, the one or more second network slices may be identifiable from a containment relationship between the first network slice and the one or more second network slices.

In some embodiments, the second programming construct may be executable by the second entity to cause the second entity to apply a criterion to select the first network slice, one or more identified second network slices, and/or one or more identified first network nodes on which to perform the management task.

In some embodiments, the first programming construct may be further executable by the second entity to cause the second entity to identify, for each identified second network slice, one or more third network slices of the network supporting the second network slice and/or one or more second network nodes of the network supporting the second network slice.

In some embodiments, the first network slice, the one or more second network slices, the one or more first network nodes, the one or more third network slices, and/or the one or more second network nodes may form a hierarchy.

In some embodiments, the one or more third network slices may be identifiable from a containment relationship between the second network slice and the one or more third network slices.

In some embodiments, the second programming construct may be executable by the second entity to select the first network slice, one or more identified second network slices, one or more identified first network nodes, one or more identified third network slices, and/or one or more identified second network nodes, on which to perform the management task.

According to another aspect of the disclosure, there is provided a first entity. The first entity comprises processing circuitry configured to operate in accordance with the method described earlier in respect of the first entity. The first entity thus provides the advantages discussed earlier in respect of the method performed by the first entity. In some embodiments, the first entity may comprise at least one memory for storing instructions which, when executed by the processing circuitry, cause the first entity to operate in accordance with the method described earlier in respect of the first entity.

According to another aspect of the disclosure, there is provided another method for network management. The method is performed by a second entity. The second entity is configured to manage network slices of a network. The method is performed in response to a request for performance of a management task on the network. The request comprises a first programming construct, a second programming construct, and information identifying a first network slice of the network. The method comprises executing the first programming construct to identify one or more second network slices of the network supporting the first network slice and/or one or more first network nodes of the network supporting the first network slice. The method comprises executing the second programming construct to select the first network slice, one or more identified second network slices, and/or one or more identified first network nodes on which to perform the management task.

There is thus provided an advantageous method for network management. In particular, there is provided a mechanism that allows a second entity to correctly select a specific portion of the network on which a management task is to be performed. The mechanism allows this even in the case of a customised logical network. An operator does not need to provide the names of all network slices and all network nodes on which the management task is to be performed. Instead, only the identity of a single (first) network slice needs to be provided together with the first and second programming constructs. This significantly simplifies the procedure for enabling the performance of a management task on a specific portion of the network and thus makes the procedure more efficient. Moreover, as the method only requires transmission of the identity of a single (first) network slice and two programming constructs, rather than many identities of each and every network slice and network node on which the management task is to be performed, the method can conserve bandwidth.

In some embodiments, the one or more second network slices of the network may be directly or indirectly supporting the first network slice.

In some embodiments, the first network slice, the one or more second network slices, and the one or more first network nodes may form a hierarchy.

In some embodiments, the first network slice may be at the apex of the hierarchy.

In some embodiments, the one or more second network slices may be identified from a containment relationship between the first network slice and the one or more second network slices.

In some embodiments, the method may comprise executing the second programming construct to apply a criterion to select the first network slice, one or more identified second network slices, and/or one or more identified first network nodes on which to perform the management task.

In some embodiments, the method may comprise, for each identified second network slice, repeating execution of the first programming construct to identify one or more third network slices of the network supporting the second network slice, and/or one or more second network nodes of the network supporting the second network slice.

In some embodiments, the first network slice, the one or more second network slices, the one or more first network nodes, the one or more third network slices, and/or the one or more second network nodes may form a hierarchy.

In some embodiments, the one or more third network slices may be identified from a containment relationship between the second network slice and the one or more third network slices.

In some embodiments, the second programming construct may be executed to select the first network slice, one or more identified second network slices, one or more identified first network nodes, one or more identified third network slices, and/or one or more identified second network nodes on which to perform the management task.

In some embodiments, the method may comprise initiating the performance of the management task.

In some embodiments, the performance of the management task may comprise generating a report on the selected network slices and/or network nodes.

In some embodiments, the performance of the management task may comprise acquiring a report on the selected network nodes from a third entity, wherein the third entity is configured to manage network nodes of the network.

According to another aspect of the disclosure, there is provided a second entity. The second entity comprises processing circuitry configured to operate in accordance with the method described earlier in respect of the second entity. The second entity thus provides the advantages discussed earlier in respect of the method performed by the second entity. In some embodiments, the second entity may comprise at least one memory for storing instructions which, when executed by the processing circuitry, cause the second entity to operate in accordance with the method described earlier in respect of the second entity.

According to another aspect of the disclosure, there is provided a method performed by a system. The method performed by the system may comprise the method performed by the first entity as described earlier and the method performed by the second entity as described earlier. The method performed by the system thus provides the advantages discussed earlier in respect of the method performed by the first entity and the method performed by the second entity.

According to another aspect of the disclosure, there is provided a system. The system may comprise at least one first entity as described earlier and at least one second entity as described earlier. The system thus provides the advantages discussed earlier in respect of the method performed by the first entity and the second entity.

According to another aspect of the disclosure, there is provided a computer program comprising instructions which, when executed by processing circuitry, cause the processing circuitry to perform the method described earlier in respect of the first entity and/or second entity. The computer program thus provides the advantages discussed earlier in respect of the method performed by the first entity and/or second entity.

According to another aspect of the disclosure, there is provided a computer program product, embodied on a non-transitory machine readable medium, comprising instructions which are executable by processing circuitry to cause the processing circuitry to perform the method described earlier in respect of the first entity and/or second entity. The computer program product thus provides the advantages discussed earlier in respect of the method performed by the first entity and/or second entity.

Therefore, advantageous techniques for network management are provided.

BRIEF DESCRIPTION OF THE DRAWINGS

For a better understanding of the techniques, and to show how they may be put into effect, reference will now be made, by way of example, to the accompanying drawings, in which.

DETAILED DESCRIPTION

As mentioned earlier, advantageous techniques for network management are described herein. The techniques described herein can be used in respect of any network, such as any communications network. The network may be a fifth generation (5G) network or any other generation network. In some embodiments, the network may be a core network or a radio access network (RAN). The techniques are implemented by a first entity and/or a second entity.

Figure 1:
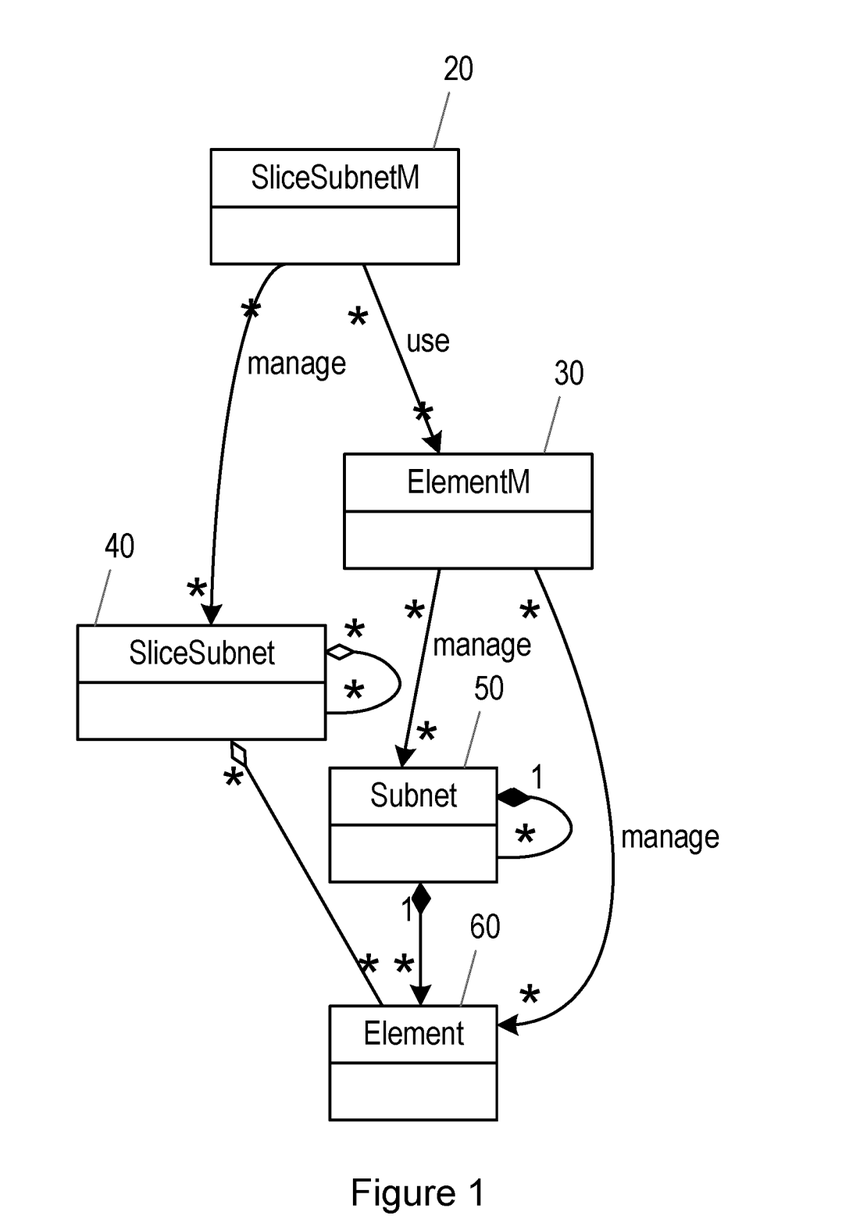
FIG. 1 is a block diagram illustrating a system according to an embodiment.

FIG. 1 illustrates a system in which such a first entity and/or second entity can be employed. The system is for network management. The second entity 20 is illustrated in the system of FIG. 1. In the system illustrated in FIG. 1, the second entity 20 is a network slice manager. That is, the second entity 20 is configured to manage one or more network slices in a network. Herein, a group of network slices 40 form a logical network. This logical network can be thought of as a subnetwork of the network. Thus, a group of network slices 40 may be referred to as a slice subnetwork ("SliceSubnet"). Similarly, the network slice manager may be referred to as a slice subnet manager ("SliceSunetM") and can be said to manage one or more slice subnets 40. As illustrated in FIG. 1, the system may comprise at least one slice subnet 40. Within the at least one slice subnet 40, any one or more of the network slices may support at least one other network slice.

In some embodiments, there may be a containment relationship between two or more network slices. Generally, a containment relationship is indicative of one object containing another object. Thus, the containment relationship between two or more network slices can be indicative of one network slice containing another network slice, e.g. one network slice containing its supporting network of other network slices. In some embodiments, a network slice may contain one or more slice subnets. The containment relationship between two or more network slices is a logical containment relationship. The containment relationship between two or more network slices makes it possible to identify which network slice (or which slice subnet) supports which other network slice. In FIG. 1, the containment relationship between network slices is illustrated by the hollow diamond to the right of the slice subnet 40. Herein, the terms network slice and slice subnet may be interchanged.

In a similar manner, in some embodiments, there may be a containment relationship between one or more network slices and one or more network nodes. As mentioned earlier, generally, a containment relationship is indicative of one object containing another object. Thus, the containment relationship between one or more network slices and one or more network nodes can be indicative of at least one network slice containing at least one network node, e.g. at least one network slice is supported by at least one network node. The containment relationship between one or more network slices and one or more network nodes can be a logical containment relationship according to some embodiments. The containment relationship between one or more network slices and one or more network nodes makes it possible to identify which network node supports which network slice (or slice subnet). In FIG. 1, the containment relationship between network slices and network nodes is illustrated by the hollow diamond below the slice subnet 40.

The system illustrated in FIG. 1 can comprise one or more network nodes of the network. Herein, a network node may be a virtual network node (e.g. a function) or a physical network node (e.g. a base station, such as a radio base station). A group of network nodes 50 can form a physical network according to some embodiments. The physical network can also be thought of as a subnetwork of the network. Thus, a group of network nodes 50 may also be referred to as a subnetwork ("Subnet"). As illustrated in FIG. 1, the system may comprise at least one subnet 50. In some embodiments, at least one subnet 50 may support at least one other network node 60. Herein, a network node may also be referred to as an element. Thus, the at least one other network node 60 can be referred to as at least one element ("Element"). A node (such as any one or more of the at least one other network node 60) may support at least one network slice or at least one slice subnet 40. Herein, the network nodes and network slices in the network can generally be referred to as objects in the network.

As illustrated in FIG. 1, the system may comprise a third entity 30. The third entity 30 is configured to manage one or more network nodes in the network, such as the at least one subnet 50 and/or the at least one other network node 60. As a network node may also be referred to as an element, the third entity 30 may thus be referred to as an element manager ("ElementM"). The second entity 20 can communicate with the third entity 30, thereby allowing the second entity 20 to use the third entity 30. Although not illustrated in FIG. 1, the system can comprise the first entity 10. The first entity 10 can communicate with the second entity 20 and/or the third entity 30.

In some embodiments, there may be a containment relationship between two or more network nodes. As mentioned earlier, generally, a containment relationship is indicative of one object containing another object. Thus, the containment relationship between two or more network nodes can be indicative of one network node containing another network node, e.g. one network node containing its supporting network of other network nodes. In some embodiments, a network node may contain one or more subnets. The containment relationship between two or more network nodes can be a logical containment relationship according to some embodiments, e.g. where one or more of the network nodes is a network function. The containment relationship between two or more network nodes makes it possible to identify which network node (or which subnet) supports which other network node. In FIG. 1, the containment relationship between network nodes is illustrated by the solid diamonds to the right of and below the subnet 50. Herein, the terms element, node, and function may be interchanged.

Figure 2:
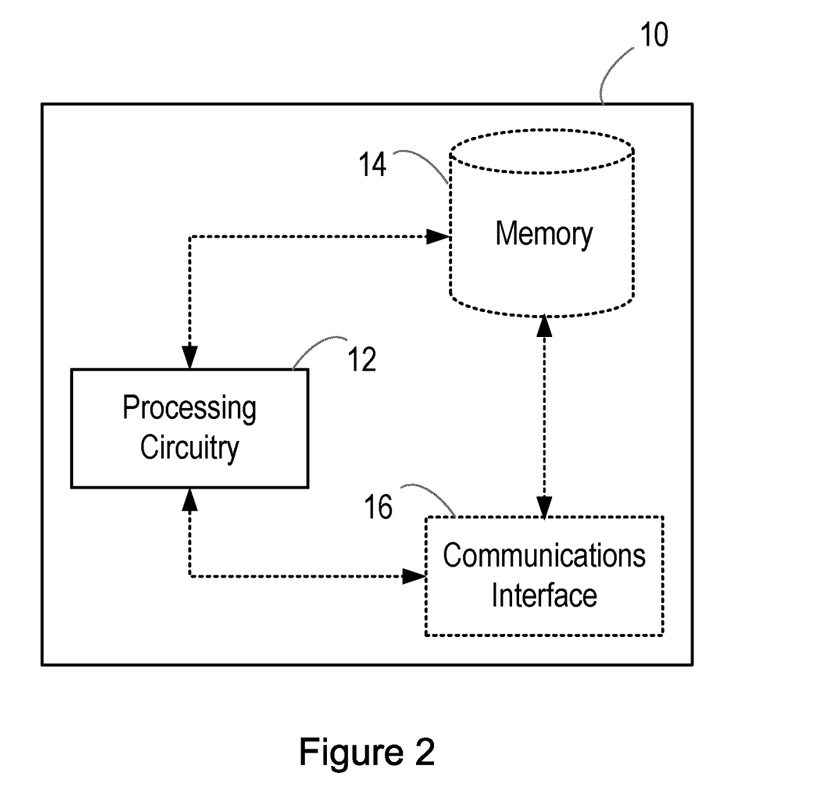
FIG. 2 is a block diagram illustrating a first entity according to an embodiment.

FIG. 2 illustrates a first entity 10 in accordance with an embodiment. The first entity 10 is for managing services in a network. In some embodiments, the first entity 10 can be an operator terminal. The operator terminal 10 can be any terminal for use by an operator of the network. For example, the operator terminal 10 may be a mobile device in some embodiments.

As illustrated in FIG. 2, the first entity 10 comprises processing circuitry (or logic) 12. The processing circuitry 12 controls the operation of the first entity 10 and can implement the method described herein in respect of the first entity 10. The processing circuitry 12 can be configured or programmed to control the first entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first entity 10. In some embodiments, the processing circuitry 12 can be configured to run software to perform the method described herein in respect of the first entity 10. The software may be containerised according to some embodiments. Thus, in some embodiments, the processing circuitry 12 may be configured to run a container to perform the method described herein in respect of the first entity 10.

Briefly, the processing circuitry 12 of the first entity 10 is configured to initiate transmission of a request towards a second entity. The second entity is configured to manage network slices of the network and the request is for performance of a management task on the network. The request comprises information identifying a first network slice of the network. The request also comprises a first programming construct executable by the second entity to cause the second entity to identify one or more second network slices of the network supporting the first network slice and/or one or more first network nodes of the network supporting the first network slice. The request also comprises a second programming construct executable by the second entity to cause the second entity to select the first network slice, one or more identified second network slices, and/or one or more identified first network nodes on which to perform the management task.

As illustrated in FIG. 2, in some embodiments, the first entity 10 may optionally comprise a memory 14. The memory 14 of the first entity 10 can comprise a volatile memory or a non-volatile memory. In some embodiments, the memory 14 of the first entity 10 may comprise a non-transitory media. Examples of the memory 14 of the first entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first entity 10 can be connected to the memory 14 of the first entity 10. In some embodiments, the memory 14 of the first entity 10 may be for storing program code or instructions which, when executed by the processing circuitry 12 of the first entity 10, cause the first entity 10 to operate in the manner described herein in respect of the first entity 10. For example, in some embodiments, the memory 14 of the first entity 10 may be configured to store program code or instructions that can be executed by the processing circuitry 12 of the first entity 10 to cause the first entity 10 to operate in accordance with the method described herein in respect of the first entity 10. Alternatively or in addition, the memory 14 of the first entity 10 can be configured to store any information, data, messages, requests, responses, indications, notifications, signals, or similar, that are described herein. The processing circuitry 12 of the first entity 10 may be configured to control the memory 14 of the first entity 10 to store information, data, messages, requests, responses, indications, notifications, signals, or similar, that are described herein.

In some embodiments, as illustrated in FIG. 2, the first entity 10 may optionally comprise a communications interface 16. The communications interface 16 of the first entity 10 can be connected to the processing circuitry 12 of the first entity 10 and/or the memory 14 of first entity 10. The communications interface 16 of the first entity 10 may be operable to allow the processing circuitry 12 of the first entity 10 to communicate with the memory 14 of the first entity 10 and/or vice versa. Similarly, the communications interface 16 of the first entity 10 may be operable to allow the processing circuitry 12 of the first entity 10 to communicate with the second entity and/or any other entity. The communications interface 16 of the first entity 10 can be configured to transmit and/or receive information, data, messages, requests, responses, indications, notifications, signals, or similar, that are described herein. In some embodiments, the processing circuitry 12 of the first entity 10 may be configured to control the communications interface 16 of the first entity 10 to transmit and/or receive information, data, messages, requests, responses, indications, notifications, signals, or similar, that are described herein.

Although the first entity 10 is illustrated in FIG. 2 as comprising a single memory 14, it will be appreciated that the first entity 10 may comprise at least one memory (i.e. a single memory or a plurality of memories) 14 that operate in the manner described herein. Similarly, although the first entity 10 is illustrated in FIG. 2 as comprising a single communications interface 16, it will be appreciated that the first entity 10 may comprise at least one communications interface (i.e. a single communications interface or a plurality of communications interface) 16 that operate in the manner described herein. It will also be appreciated that FIG. 2 only shows the components required to illustrate an embodiment of the first entity 10 and, in practical implementations, the first entity 10 may comprise additional or alternative components to those shown.

Figure 3:
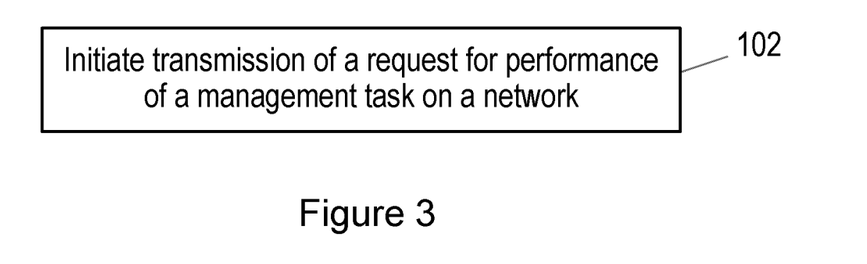
FIG. 3 is a block diagram illustrating a method performed by a first entity according to an embodiment.

FIG. 3 is a flowchart illustrating a method performed by a first entity 10 in accordance with an embodiment. The first entity 10 is configured to operate a network. The method is for network management. The first entity 10 described earlier with referenced to FIG. 2 is configured to operate in accordance with the method of FIG. 3. The method can be performed by or under the control of the processing circuitry 12 of the first entity 10.

As illustrated at block 102 of FIG. 3, transmission of a request is initiated towards a second entity 20. More specifically, the processing circuitry 12 of the first entity 10 the processing circuitry 12 of the first entity 10 initiates transmission of the request towards the second entity 20. The second entity 20 is configured to manage network slices of the network. Herein, the term "initiate" can mean, for example, cause or establish. Thus, the processing circuitry 12 of the first entity 10 can be configured to itself transmit the request (e.g. via a communications interface 16 of the first entity 10) or can be configured to cause another entity to transmit the request.

The request is for performance of a management task on the network. The request comprises information identifying a first network slice of the network. The request also comprises a first programming construct executable by the second entity 20 to cause the second entity 20 to identify one or more second network slices of the network supporting the first network slice and/or one or more first network nodes of the network supporting the first network slice. The one or more second network slices of the network may be directly or indirectly supporting the first network slice. Herein, the first programming construct may also be referred to as a "scope construct". The request also comprises a second programming construct executable by the second entity 20 to cause the second entity 20 to select the first network slice, one or more identified second network slices, and/or one or more identified first network nodes on which to perform the management task. Herein, the second programming construct may also be referred to as a "filter construct".

Thus, it can be said that the request comprises a scope and filter construct. This scope and filter construct allows the first entity 10 (or, more specifically, an operator of the network using the first entity 10) to place a request for a management task to be performed on a specific portion of the network. The scope and filter construct described herein can facilitate the process of identifying specific managed network slices and/or network nodes having certain characteristics within a logical network. A logical network can be defined as a network of managed network slices and/or network nodes whose organisation is (e.g. dynamically) constructed based on the requirements of a customer of the network operator. This is in contrast to a physical network, which can be defined as a network of managed network slices and/or nodes whose organisation is fixed after the managed elements are deployed.

In some embodiments, the first network slice, the one or more second network slices, and the one or more network nodes form a hierarchy. In some of these embodiments, the first network slice may be at the apex of the hierarchy. This hierarchy may also be referred to as a network slice tree. The scope and filter construct described herein allows the first entity 10 (or, more specifically, an operator of the network using the first entity 10) to place a request for a management task to be performed on a specific portion of this network slice tree.

In some embodiments, the one or more second network slices are identifiable from a containment relationship between the first network slice and the one or more second network slices. The containment relationship between the first network slice and the one or more second network slices is a logical containment relationship.

In some embodiments, the second programming construct may be executable by the second entity 20 to cause the second entity 20 to apply a criterion to select the first network slice, one or more identified second network slices, and/or one or more identified first network nodes on which to perform the management task.

In some embodiments, the first programming construct may be further executable by the second entity 20 to cause the second entity 20 to identify, for each identified second network slice, one or more third network slices of the network supporting the second network slice and/or one or more second network nodes of the network supporting the second network slice. In some embodiments, one or more identified second network nodes may be the same as one or more identified first network nodes.

In some embodiments, the first network slice 40, the one or more second network slices, the one or more first network nodes 60, the one or more third network slices, and/or the one or more second network nodes may form a hierarchy. In some embodiments, the one or more third network slices may be identifiable from a containment relationship between the second network slice and the one or more third network slices. The containment relationship between the second network slice and the one or more third network slices is a logical containment relationship.

In some embodiments, the second programming construct may be executable by the second entity 20 to select the first network slice 40, one or more identified second network slices, one or more identified first network nodes 60, one or more identified third network slices, and/or one or more identified second network nodes, on which to perform the management task.

Although the method has been described in respect of second and third network slices, it will be understood that the method may be repeated in respect of any number of network slices. That is, for each identified network slice, the method may be repeated to identify any network slices and/or network nodes supporting that network slice and to select which of those identified network slice(s) and/or network node(s) to perform the management task on.

Figure 4:
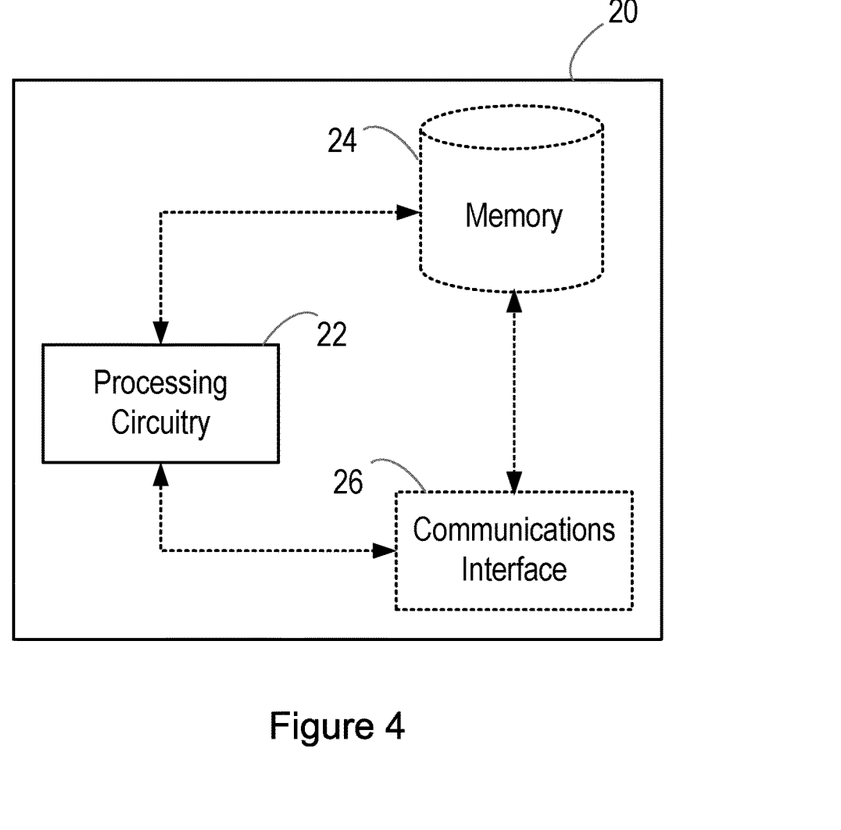
FIG. 4 is a block diagram illustrating a second entity according to an embodiment.

FIG. 4 illustrates a second entity 20 in accordance with an embodiment. The second entity 20 is for network management. The second entity 20 may, for example, be a physical machine (e.g. a server) or a virtual machine (VM).

As illustrated in FIG. 4, the second entity 20 comprises processing circuitry (or logic) 22. The processing circuitry 22 controls the operation of the second entity 20 and can implement the method described herein in respect of the second entity 20. The processing circuitry 22 can be configured or programmed to control the second entity 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the second entity 20. In some embodiments, the processing circuitry 22 can be configured to run software to perform the method described herein in respect of the second entity 20. The software may be containerised according to some embodiments. Thus, in some embodiments, the processing circuitry 22 may be configured to run a container to perform the method described herein in respect of the second entity 20.

Briefly, the processing circuitry 22 of the second entity 20 is configured to perform a method in response to a request for performance of a management task on the network. The request comprises a first programming construct, a second programming construct, and information identifying a first network slice of the network. Specifically, the processing circuitry 22 of the second entity 20 is configured to execute the first programming construct to identify one or more second network slices of the network supporting the first network slice and/or one or more first network nodes of the network supporting the first network slice. The processing circuitry 22 of the second entity 20 is also configured to execute the second programming construct to select the first network slice, one or more identified second network slices, and/or one or more identified first network nodes on which to perform the management task.

As illustrated in FIG. 4, in some embodiments, the second entity 20 may optionally comprise a memory 24. The memory 24 of the second entity 20 can comprise a volatile memory or a non-volatile memory. In some embodiments, the memory 24 of the second entity 20 may comprise a non-transitory media. Examples of the memory 24 of the second entity 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the second entity 20 can be connected to the memory 24 of the second entity 20. In some embodiments, the memory 24 of the second entity 20 may be for storing program code or instructions which, when executed by the processing circuitry 22 of the second entity 20, cause the second entity 20 to operate in the manner described herein in respect of the second entity 20. For example, in some embodiments, the memory 24 of the second entity 20 may be configured to store program code or instructions that can be executed by the processing circuitry 22 of the second entity 20 to cause the second entity 20 to operate in accordance with the method described herein in respect of the second entity 20. Alternatively or in addition, the memory 24 of the second entity 20 can be configured to store any information, data, messages, requests, responses, indications, notifications, signals, or similar, that are described herein. The processing circuitry 22 of the second entity 20 may be configured to control the memory 24 of the second entity 20 to store information, data, messages, requests, responses, indications, notifications, signals, or similar, that are described herein.

In some embodiments, as illustrated in FIG. 4, the second entity 20 may optionally comprise a communications interface 26. The communications interface 26 of the second entity 20 can be connected to the processing circuitry 22 of the second entity 20 and/or the memory 24 of second entity 20. The communications interface 26 of the second entity 20 may be operable to allow the processing circuitry 22 of the second entity 20 to communicate with the memory 24 of the second entity 20 and/or vice versa. Similarly, the communications interface 26 of the second entity 20 may be operable to allow the processing circuitry 22 of the second entity 20 to communicate with the first entity 10 and/or any other entity. The communications interface 26 of the second entity 20 can be configured to transmit and/or receive information, data, messages, requests, responses, indications, notifications, signals, or similar, that are described herein. In some embodiments, the processing circuitry 22 of the second entity 20 may be configured to control the communications interface 26 of the second entity 20 to transmit and/or receive information, data, messages, requests, responses, indications, notifications, signals, or similar, that are described herein.

Although the second entity 20 is illustrated in FIG. 4 as comprising a single memory 24, it will be appreciated that the second entity 20 may comprise at least one memory (i.e. a single memory or a plurality of memories) 24 that operate in the manner described herein. Similarly, although the second entity 20 is illustrated in FIG. 4 as comprising a single communications interface 26, it will be appreciated that the second entity 20 may comprise at least one communications interface (i.e. a single communications interface or a plurality of communications interface) 26 that operate in the manner described herein. It will also be appreciated that FIG. 4 only shows the components required to illustrate an embodiment of the second entity 20 and, in practical implementations, the second entity 20 may comprise additional or alternative components to those shown.

Figure 5:
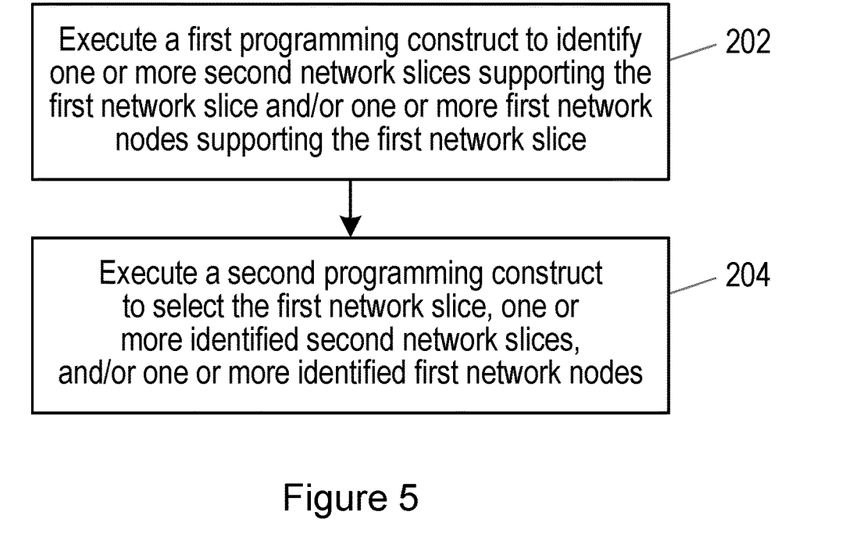
FIG. 5 is a block diagram illustrating a method performed by a second entity according to an embodiment.

FIG. 5 is a flowchart illustrating a method performed by a second entity 20 in accordance with an embodiment. The second entity 20 is configured to manage network slices of a network. The method is for network management. The second entity 20 described earlier with referenced to FIG. 4 is configured to operate in accordance with the method of FIG. 5. The method can be performed by or under the control of the processing circuitry 22 of the second entity 20. The method is performed in response to a request for performance of a management task on the network. This request comprises a first programming construct, a second programming construct, and information identifying a first network slice of the network.

As illustrated at block 202 of FIG. 5, the first programming construct is executed to identify one or more second network slices of the network supporting the first network slice and/or one or more first network nodes of the network supporting the first network slice. More specifically, the processing circuitry 22 of the second entity 20 executes the first programming construct. The one or more second network slices of the network may be directly or indirectly supporting the first network slice.

As illustrated at block 204 of FIG. 5, the second programming construct is executed to select the first network slice, one or more identified second network slices, and/or one or more identified first network nodes on which to perform the management task. More specifically, the processing circuitry 22 of the second entity 20 executes the second programming construct.

In some embodiments, the first network slice, the one or more second network slices, and the one or more first network nodes form a hierarchy. In some of these embodiments, the first network slice may be at the apex of the hierarchy.

In some embodiments, the one or more second network slices may be identified from a containment relationship between the first network slice and the one or more second network slices. The containment relationship between the first network slice and the one or more second network slices is a logical containment relationship.

In some embodiments, the second programming construct may be executed to apply a criterion to select the first network slice, one or more identified second network slices, and/or one or more identified first network nodes on which to perform the management task.

Although not illustrated in FIG. 5, in some embodiments, for each identified second network slice, execution of the first programming construct may be repeated to identify one or more third network slices of the network supporting the second network slice, and/or one or more second network nodes of the network supporting the second network slice. More specifically, the processing circuitry 22 of the second entity 20 may be configured to repeat the execution of the first programming construct according to some embodiments. In some embodiments, one or more identified second network nodes may be the same as one or more identified first network nodes.

In some of these embodiments, the first network slice, the one or more second network slices, the one or more first network nodes, the one or more third network slices, and/or the one or more second network nodes may form the hierarchy mentioned earlier. In some embodiments, the one or more third network slices may be identified from a containment relationship between the second network slice and the one or more third network slices. The containment relationship between the second network slice and the one or more third network slices is a logical containment relationship. In some embodiments, the second programming construct may be executed to select the first network slice, one or more identified second network slices, one or more identified first network nodes, one or more identified third network slices, and/or one or more identified second network nodes on which to perform the management task.

Although the method has been described in respect of second and third network slices, it will be understood that the method may be repeated in respect of any number of network slices. That is, for each identified network slice, the method may be repeated to identify any network slices and/or network nodes supporting that network slice and to select which of those identified network slice(s) and/or network node(s) to perform the management task on.

Although also not illustrated in FIG. 5, in some embodiments, the performance of the management task may be initiated. More specifically, the processing circuitry 22 of the second entity 20 may be configured to initiate performance of the management task according to some embodiments. In some embodiments, the performance of the management task may comprise generating a report (e.g. a performance and/or alarm report) on the selected network slices and/or network nodes. In some embodiments, the performance of the management task may comprises acquiring a report on the selected network nodes from a third entity 30, which is configured to manage network nodes of the network. In other embodiments, the performance of the management task may comprise changing of an operation state of the network. Although some examples have been provided for the management task that may be performed, it will be understood that any other management task is also possible.

Figure 6:
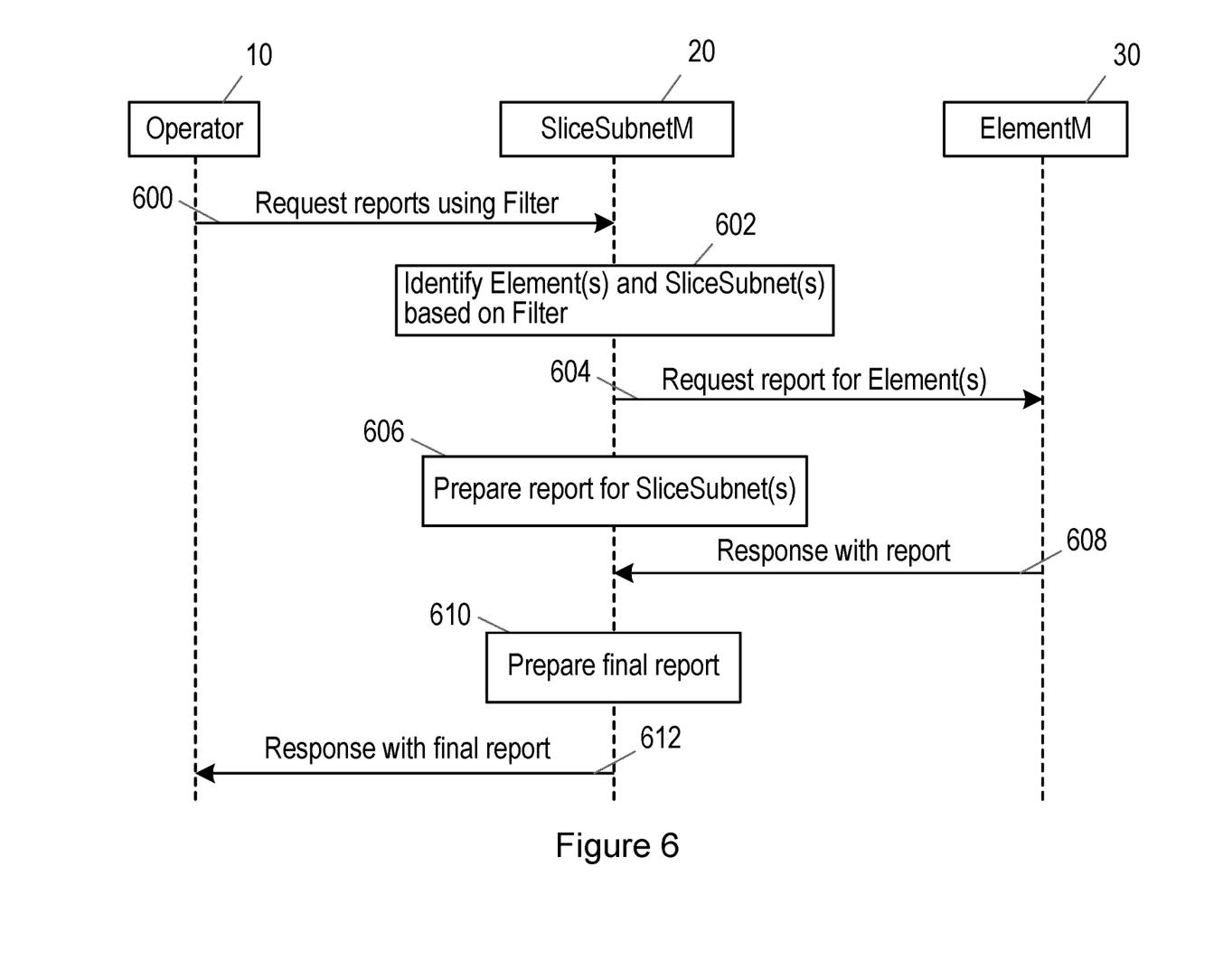
FIG. 6 is a signalling diagram illustrating an exchange of signals in a system according to an embodiment.

FIG. 6 is a signalling diagram illustrating an exchange of signals in a system according to an embodiment. The system may, for example, be the system described earlier with reference to FIG. 1. The system illustrated in FIG. 6 comprises the first entity (e.g. operator terminal) 10, the second entity (e.g. slice subnet manager) 20, and the third entity (e.g. element manager) 30. The first entity 10 can be as described earlier with reference to FIGS. 2 and 3 and the second entity 20 can be as described earlier with reference to FIGS. 4 and 5. The first entity 10 can be for use by an operator for managing a network. The second entity 20 is configured to manage one or more network slices in the network. The third entity 30 is configured to manage one or more network nodes in the network. FIG. 6 will be described with reference to FIGS. 1 and 6.

Although not illustrated in FIG. 6, in some embodiments, the first entity 10 may be configured to initiate transmission of a request to the second entity 20 for the creation of a network slice (or slice subnet). The request may be based on the needs of a customer of the network operator. The second entity 20 can be configured to create the network slice (or slice subnet), e.g. based on the needs of the customer. For example, in some embodiments, the network slice (or slice subnet) may be created to use one or more already deployed network nodes and/or one or more existing network slices or slice subnets (or instances thereof). In effect, a network slice tree comprising the created network slice can be created. After the network slice tree is created and optionally also deployed by the second entity 20, an operator of the network may request that the second entity 20 performs a management task on the network, such as on a specific portion of the network slice tree.

In this respect, as illustrated by arrow 600 of FIG. 6, the first entity 10 initiates transmission of a request 600 towards the second entity 20. The request 600 is for performance of a management task on the network. The request comprises information identifying a first network slice (or slice subnet 40) of the network. That is, the request carries the identity of the first network slice (or slice subnet 40) of the network. The first slice (or slice subnet 40) of the network can be the network slice (or slice subnet 40) at the apex, or top, of the network slice tree.

The request also comprises a first programming (or scope) construct executable by the second entity 20 to cause the second entity 20 to identify one or more second network slices (or slice subnets) of the network supporting the first network slice (or slice subnet 40) and/or one or more first network nodes 60 of the network supporting the first network slice (or slice subnet 40). The request also comprises a second programming (or filter) construct executable by the second entity 20 to cause the second entity 20 to select the first network slice (or slice subnet 40), one or more identified second network slices (or slice subnets), and/or one or more identified first network nodes 60 on which to perform the management task. Thus, the request carries a scope and filter construct. This scope and filter construct can advantageously, at block 602 of FIG. 6, be used by the second entity 20 to identify the specific portion of the network slice tree on which to perform the management task.

In particular, in response to the request, at block 602 of FIG. 6, the second entity 20 executes the first programming (or scope) construct to identify one or more second network slices (or slice subnets) of the network supporting the first network slice (or slice subnet 40) and/or one or more first network nodes 60 of the network supporting the first network slice (or slice subnet 40).

In an example, execution of the first programming (or scope) construct to enable this identification may be according to the following scheme:

(a) Start with the first network slice (or slice subnet 40) identified in the request. This may be the network slice (or slice subnet 40) at the apex, or top, of the network slice tree.

(b) Identify one or more second network slices (or slice subnets) of the network supporting the first network slice (or slice subnet 40), if any. The second network slices (or slice subnets) can be referred to as subordinate network slices (or slice subnets) of the first network slice (or slice subnet 40). The second network slices (or slice subnets) may be those with a containment relationship with the first network slice, e.g. as illustrated by the hollow diamond to the right of the slice subnet 40 in FIG. 1.

(c) Identify one or more first network nodes 60 of the network supporting the first network slice (or slice subnet 40), if any. The first network nodes 60 can be referred to as subordinate network nodes of the first network slice (or slice subnet 40). The first network nodes 60 may be those with a containment relationship with the first network slice, e.g. as illustrated by the hollow diamond below the slice subnet 40 in FIG. 1.

(d) For each identified second network slice (or slice subnet), repeat steps (b) and (c) above. All of the identified objects (network slices, slice subnets and/or network nodes) together can be called a collection.

In response to the request for performance of a management task on the network, at block 602 of FIG. 6, the second entity 20 also executes the second programming (or filter) construct to select the first network slice (or slice subnet 40), one or more identified second network slices (or slice subnets), and/or one or more identified first network nodes 60 on which to perform the management task. More specifically, the second programming (or filter) construct can be executed to apply a filter criteria to select objects out of the collection.

In some embodiments, the second entity 20 may then initiate the performance of the management task. In FIG. 6, the management task is illustrated by way of arrow 604, block 606, arrow 608, and block 610. The performance of the management task illustrated in FIG. 6 comprises generating a report on the selected network slices (or slice subnets 40) and/or network nodes. However, it will be understood that this is only one example and any other management task may be performed.

In the example of the performance of the management task illustrated in FIG. 6, as illustrated by arrow 604 of FIG. 6, the second entity 20 initiates transmission of a request towards the third entity 30 for a report on the selected network nodes. At block 606 of FIG. 6, the second entity 20 generates a report on the selected network slices (or slice subnets 40). As illustrated by arrow 608 of FIG. 6, the second entity 20 receives the requested report on the selected network nodes from a third entity 30. At block 610 of FIG. 6, the second entity 20 generates a final report. The final report is a report on the selected network slices and/or network nodes. For example, the second entity 20 can add the report received from the third entity at arrow 608 of FIG. 6 to the report that it generated at block 608 of FIG. 6. Thus, the management task is acted on for the selected objects.

In some embodiments, as illustrated by arrow 612 of FIG. 6, the second entity 20 may initiate transmission of a response towards the first entity 10. The response can comprise the final report generated at block 610 of FIG. 6. Alternatively or in addition, the response can be indicative that performance of the management task is complete.

Figure 7:
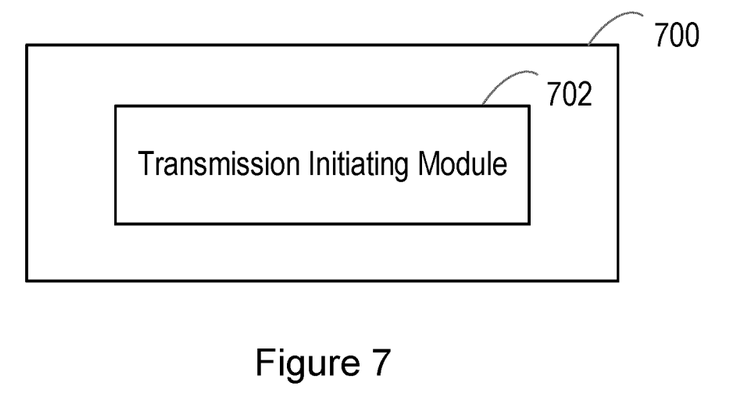
FIG. 7 is a block diagram illustrating a first entity according to an embodiment.

FIG. 7 is a block diagram illustrating a first entity 700 in accordance with an embodiment. The first entity 700 can operate a network. The first entity 700 comprises a transmission initiating module 702 configured to initiate transmission of a request towards a second entity. The second entity can manage network slices of the network. The request is for performance of a management task on the network. The request comprises information identifying a first network slice of the network. The request also comprises a first programming construct executable by the second entity to cause the second entity to identify one or more second network slices of the network supporting the first network slice and/or one or more first network nodes of the network supporting the first network slice. The request also comprises a second programming construct executable by the second entity to cause the second entity to select the first network slice, one or more identified second network slices, and/or one or more identified first network nodes on which to perform the management task. The first entity 700 may operate in the manner described herein in respect of the first entity.

Figure 8:
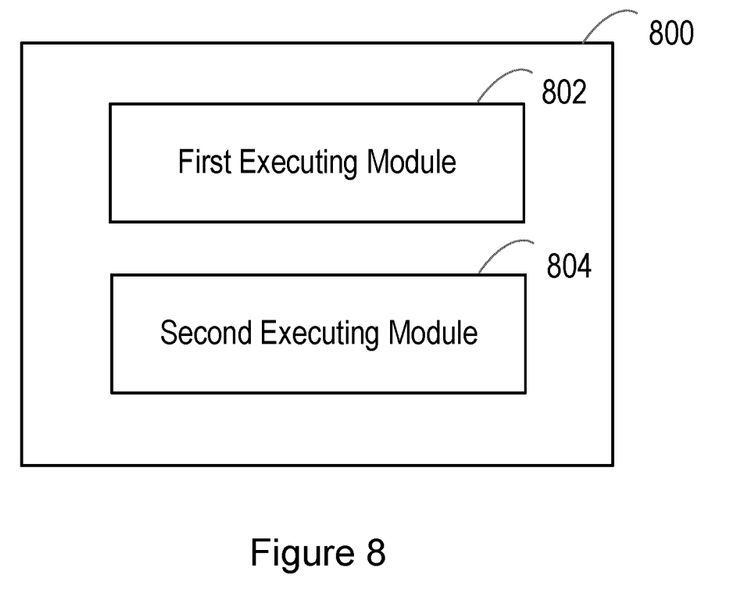
FIG. 8 is a block diagram illustrating a second entity according to an embodiment.

FIG. 8 is a block diagram illustrating a second entity 800 in accordance with an embodiment. The second entity 800 can manage network slices of a network. The second entity 800 operates in response to a request for performance of a management task on the network. The request comprises a first programming construct, a second programming construct, and information identifying a first network slice of the network. The second entity 800 comprises a first executing module 802 configured to execute the first programming construct to identify one or more second network slices of the network supporting the first network slice and/or one or more first network nodes of the network supporting the first network slice. The second entity 800 also comprises a second executing module 804 configured to execute the second programming construct to select the first network slice, one or more identified second network slices, and/or one or more identified first network nodes on which to perform the management task. The second entity 800 may operate in the manner described herein in respect of the second entity.

There is also provided a computer program comprising instructions which, when executed by processing circuitry (such as the processing circuitry 12 of the first entity 10 described earlier and/or the processing circuitry 22 of the second entity 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the first entity 10 described earlier and/or the processing circuitry 22 of the second entity 20 described earlier) to cause the processing circuitry to perform at least part of the method described herein. There is provided a computer program product comprising a carrier containing instructions for causing processing circuitry (such as the processing circuitry 12 of the first entity 10 described earlier and/or the processing circuitry 22 of the second entity 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first entity functionality and/or the second entity functionality described herein can be performed by hardware. Thus, in some embodiments, any one or more of the first entity 10 and the second entity 20 described herein can be a hardware entity. However, it will also be understood that optionally at least part or all of the first entity functionality and/or the second entity functionality described herein can be virtualized. For example, the functions performed by any one or more of the first entity 10 and the second entity 20 described herein can be implemented in software running on generic hardware that is configured to orchestrate the entity functionality. Thus, in some embodiments, any one or more of the first entity 10 and the second entity 20 described herein can be a virtual entity. In some embodiments, at least part or all of the first entity functionality and/or the second entity functionality described herein may be performed in a network enabled cloud. The first entity functionality and/or the second entity functionality described herein may all be at the same location or at least some of the entity functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided an improved technique for network management.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for network management performed by a first entity, wherein the first entity is configured to operate a network, the method comprising:
   initiating transmission of a request towards a second entity, wherein the second entity is configured to manage network slices of the network and the request is for performance of a management task on the network, wherein the request comprises:
      information identifying a first network slice of the network;
      a first programming construct executable by the second entity to cause the second entity to identify at least one of the following: one or more second network slices of the network supporting the first network slice, and one or more first network nodes of the network supporting the first network slice; and
      a second programming construct executable by the second entity to cause the second entity to select at least one of the following: the first network slice, one or more identified second network slices, and one or more identified first network nodes, on which to perform the management task.

2. The method as claimed in claim 1, wherein the one or more second network slices of the network are directly or indirectly supporting the first network slice.

3. The method as claimed in claim 1, wherein the first network slice, the one or more second network slices, and the one or more network nodes form a hierarchy.

4. The method as claimed in claim 3, wherein the first network slice is at the apex of the hierarchy.

5. The method as claimed in claim 1, wherein the one or more second network slices are identifiable from a containment relationship between the first network slice and the one or more second network slices.

6. The method as claimed in claim 1, wherein the second programming construct is executable by the second entity to cause the second entity to apply a criterion to select the first network slice, one or more identified second network slices, and/or one or more identified first network nodes, on which to perform the management task.

7. The method as claimed in claim 1, wherein the first programming construct is further executable by the second entity to cause the second entity to identify, for each identified second network slice, one or more third network slices of the network supporting the second network slice and/or one or more second network nodes of the network supporting the second network slice.

8. The method as claimed in claim 7, wherein the one or more third network slices are identifiable from a containment relationship between the second network slice and the one or more third network slices.

9. The method as claimed in claim 7, wherein the second programming construct is executable by the second entity to select the first network slice, one or more identified second network slices, one or more identified first network nodes, one or more identified third network slices, and/or one or more identified second network nodes, on which to perform the management task.

10. The method as claimed in claim 1, wherein the network is a core network or a radio access network.

11. A first entity for performing network management, the first entity comprising:
   processing circuitry; and
   at least one memory storing instructions which, when executed by the processing circuitry, configures the processing circuitry to initiate transmission of a request towards a second entity, wherein the second entity is configured to manage network slices of the network and the request is for performance of a management task on the network, and wherein the request comprises:
      information identifying a first network slice of the network;
      a first programming construct executable by the second entity to cause the second entity to identify at least one of the following: one or more second network slices of the network supporting the first network slice, and one or more first network nodes of the network supporting the first network slice; and
      a second programming construct executable by the second entity to cause the second entity to select at least one of the following: the first network slice, one or more identified second network slices, and one or more identified first network nodes, on which to perform the management task.

12. A method for network management performed by a second entity, wherein the second entity is configured to manage network slices of a network, the method comprising, in response to a request for performance of a management task on the network, wherein the request comprises a first programming construct, a second programming construct, and information identifying a first network slice of the network:
   executing the first programming construct to identify at least one of the following: one or more second network slices of the network supporting the first network slice, and one or more first network nodes of the network supporting the first network slice; and
   executing the second programming construct to select at least one of the following: the first network slice, one or more identified second network slices, and one or more identified first network nodes, on which to perform the management task.

13. The method as claimed in claim 12, wherein the one or more second network slices of the network directly or indirectly support the first network slice.

14. The method as claimed in claim 12, wherein the first network slice, the one or more second network slices, and the one or more first network nodes form a hierarchy.

15. The method as claimed in claim 14, wherein the first network slice is at the apex of the hierarchy.

16. The method as claimed in claim 12, wherein the one or more second network slices are identified from a containment relationship between the first network slice and the one or more second network slices.

17. The method as claimed in claim 12, further comprising executing the second programming construct to apply a criterion to select the first network slice, one or more identified second network slices, and/or one or more identified first network nodes, on which to perform the management task.

18. The method as claimed in claim 12, the method comprising, for each identified second network slice, repeating execution of the first programming construct to identify one or more third network slices of the network supporting the second network slice, and/or one or more second network nodes of the network supporting the second network slice.

19. The method as claimed in claim 18, wherein the one or more third network slices are identified from a containment relationship between the second network slice and the one or more third network slices.

20. The method as claimed in claim 12, wherein the second programming construct is executed to select the first network slice, one or more identified second network slices, one or more identified first network nodes, one or more identified third network slices, and/or one or more identified second network nodes, on which to perform the management task.

21. The method as claimed in claim 12, the method comprising initiating the performance of the management task.

22. The method as claimed in claim 12, wherein the performance of the management task comprises generating a report on the selected network slices and/or network nodes.

23. The method as claimed in claim 12, wherein the performance of the management task comprises acquiring a report on the selected network nodes from a third entity, wherein the third entity is configured to manage network nodes of the network.

24. The method as claimed in claim 12, wherein the network is a core network or a radio access network.

25. A second entity for performing network management, the second entity comprising:
- processing circuitry; and
- at least one memory storing instructions which, when executed by the processing circuitry, cause the second entity to, in response to a request for performance of a management task on a network, wherein the request comprises a first programming construct, a second programming construct, and information identifying a first network slice of the network:
  - execute the first programming construct to identify at least one of the following: one or more second network slices of the network supporting the first network slice, and one or more first network nodes of the network supporting the first network slice; and
  - execute the second programming construct to select at least one of the following: the first network slice, one or more identified second network slices, and one or more identified first network nodes, on which to perform the management task.

* * * * *